March 17, 1953 — W. A. HORNE ET AL — 2,632,016
HYDROCARBON SYNTHESIS PROCESS
Filed Dec. 28, 1949
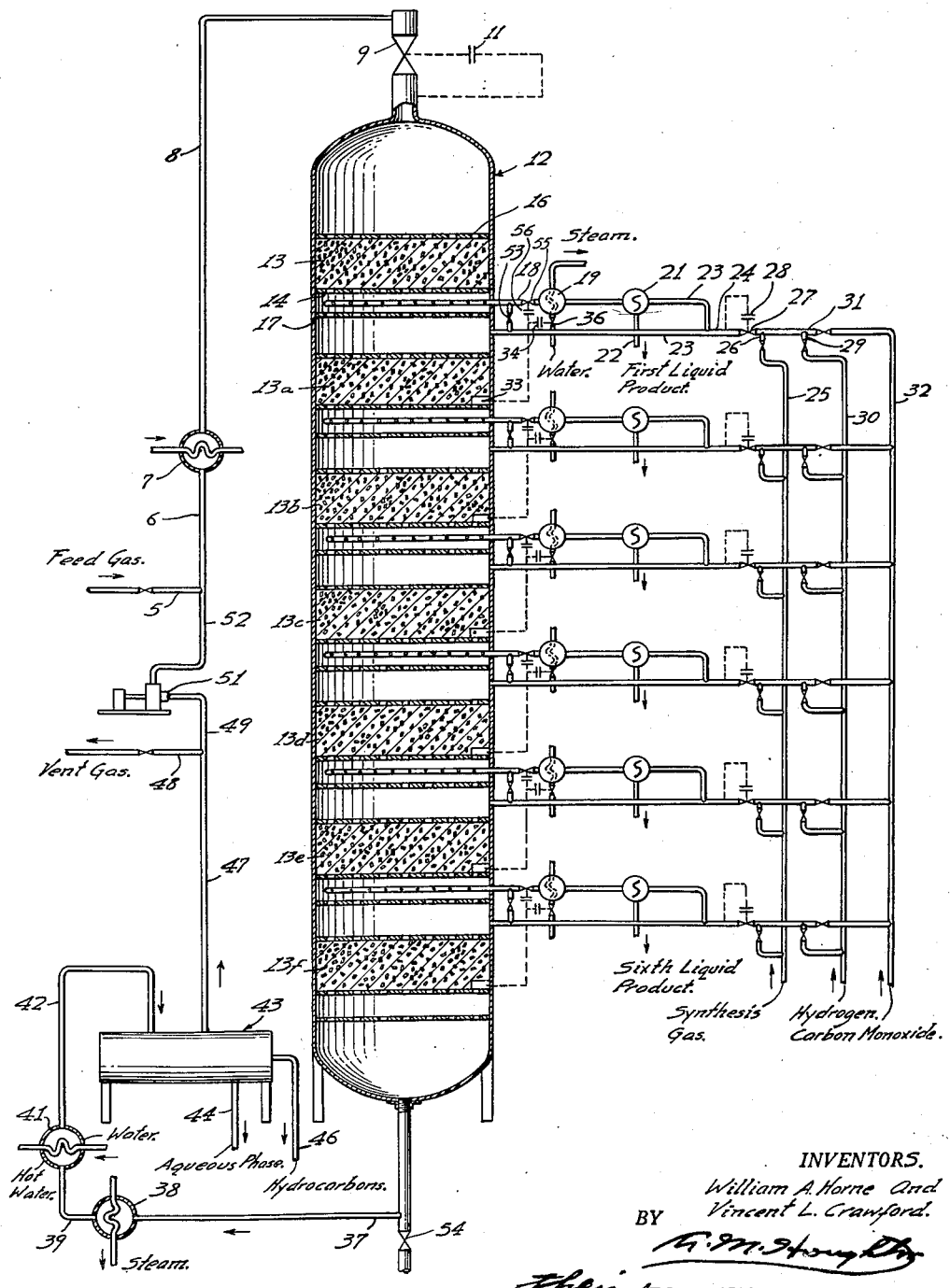
INVENTORS.
William A. Horne and
Vincent L. Crawford.
BY
their ATTORNEY.

Patented Mar. 17, 1953

2,632,016

UNITED STATES PATENT OFFICE 2,632,016

HYDROCARBON SYNTHESIS PROCESS

William A. Horne and Vincent L. Crawford, Oakmont, Pa., assignors to Gulf Research & Development Company, Pittsburgh, Pa., a corporation of Delaware Application December 28, 1949, Serial No. 135,494

9 Claims. (Cl. 260—449.6)

This invention relates to the production of hydrocarbons by the reaction between hydrogen and carbon monoxide. More particularly, the invention relates to a process for the production of hydrocarbons from hydrogen and carbon monoxide utilizing a series of fixed catalyst beds.

In the production of hydrocarbons, for example hydrocarbons containing three or more carbon atoms such as hydrocarbons boiling within the gasoline and gas oil boiling ranges and wax hydrocarbons, by means of the reaction between hydrogen and carbon monoxide, problems arise because of the highly exothermic nature of the reaction and because of the economic necessity of maintaining long catalyst life. In the past, attempts have been made to solve the problem of temperature control by using a reactor comprising a plurality of catalyst tubes of relatively small cross-sectional area immersed in a liquid cooling medium. This has not proved to be an entirely satisfactory solution to the problem, both because of the high initial cost of the equipment and the high maintenance costs which are especially serious when catalyst change becomes necessary.

It is important in carrying out the reaction that the catalyst remain effective for long periods before regeneration is necessary and that it be capable of being used in a plurality of on-stream periods. Operations which tend to reduce catalyst life are undesirable not only because of the catalyst and change-over costs but also because of the time required to bring the system completely on stream.

The process of the invention should be carried out so as to obtain high conversion of carbon monoxide as it passes through a catalyst bed, preferably at least 98 per cent, and ordinarily a run should be stopped when the conversion has fallen to below 95 per cent. High conversions are important because any carbon monoxide that has not been converted to useful products in a process of this type cannot be recovered effectively.

We have discovered in accordance with our invention that carbon monoxide can be effectively converted, long catalyst life obtained, and the exothermic reaction can be controlled in relatively simple equipment by carrying out the reaction between hydrogen and carbon monoxide, as described below. In its broader aspects this process comprises the use of any synthesis catalyst such as a cobalt or iron catalyst. However, iron catalysts are preferred and the following description will largely be concerned with such catalysts. The preferred embodiment comprises passing into contact with a series of beds of iron synthesis catalyst maintained at hydrocarbon synthesis temperatures and superatmospheric pressures a reactive gas mixture comprising hydrogen, carbon monoxide and recycled gases, removing partially reacted gases from each of the catalyst beds, removing a side stream of partially reacted gases from between catalyst beds while passing the main stream of partially reacted gases towards the succeeding catalyst bed, cooling the side stream, introducing make-up gas comprising carbon monoxide into the side stream, mixing the side stream to which make-up gases have been added with the main stream of partially reacted gases, passing the partially reacted mixture at a hydrocarbon synthesis initiation temperature to the succeeding catalyst bed, while varying the amount of cooling of the side stream in accordance with variations in temperatures of the succeeding catalyst bed.

The reacted gases are removed after the last catalyst bed and are cooled to condense at least the normally liquid hydrocarbons and other compounds boiling above said hydrocarbons. Preferably the condensation is carried out to condense most of the $C_4$ and heavier hydrocarbons and oxygenated compounds formed in the reaction. The remainder of the reaction products in gas phase under these conditions is separated into a portion for recycling and a portion which is removed from the system. The recycled portion is then admixed with fresh feed gas, preferably heated to about the temperature required for initiation of the desired reaction, and passed into contact with the catalyst.

A long useful catalyst life is obtained when operating as described if the temperature gradients across the catalyst beds are controlled. Excellent results are obtained with the gradient in the range of about 100° to 200° F., and preferred results are obtained with a range of about 125° to 165° F. The initial and final catalyst bed temperatures depend upon the space velocity, charge composition, the iron catalyst employed and its activity. The minimum hydrocarbon synthesis initiation temperature should lie within the range of about 430° to about 525° F. and the maximum temperature at the exit side of the catalyst bed should be maintained between about 610° to about 630° F.

We have found that the heat which is furnished by the exothermic reaction may be controlled by cooling the side stream from the discharge temperature of about 610° to about 630° F. to a side stream temperature of as low as about 100° F. or even lower. However, it is generally unnecessary to cool the side stream below 100° F., which is a temperature that is easily attained. In so cooling, the normally liquid hydrocarbons and oxygenated compounds produced in the reaction are liquefied and these may readily be removed from the side stream.

The life of the catalyst is also directly affected by the mol ratio of hydrogen to carbon monoxide in the gases fed to the series of catalyst beds. In the presence of recycle gases which contain hydrocarbons, oxygenated compounds, and diluents such as carbon dioxide and water, the catalyst will have an especially long useful life with temperature gradients such as those described above if the hydrogen to carbon monoxide mol ratio of the reactive gas fed to the beds of catalyst is maintained at more than 15:1 and preferably from 15:1 to 30:1.

In order to maintain the hydrogen to carbon monoxide ratio above the desired 15:1 ratio or in order to maintain it at a constant value in each of the beds, the make-up gas may comprise hydrogen and carbon monoxide. This make-up gas introduced between beds may be of a constant or variable hydrogen to carbon monoxide ratio. In this way the ratio of hydrogen to carbon monoxide of the partially reacted gases may be kept constant by introducing hydrogen and carbon monoxide in the same ratio at which they are consumed in the reaction or the ratio may be increased or decreased as desired by varying the ratio in the make-up gas. Synthesis gas with a fixed hydrogen to carbon monoxide ratio may be introduced between each bed and a separate source of hydrogen and carbon monoxide may be furnished for making adjustments.

By operating as described, the catalyst can remain on stream for an extended time and it may be subjected to a plurality of regeneration and on-stream periods. In addition, the liquid products removed from each bed may be separately cooled. The liquid products obtained from the later beds or higher in heavier hydrocarbons, and thus separating the liquid products from the various catalyst beds makes the subsequent processing and fractionation of these products much more simple. If desired, however, it is not necessary to remove liquid products from each catalyst bed. Instead this may be done at intervals or all of the separation of products may be carried out after the last catalyst bed.

Either the degree to which the side stream is cooled or the amount of gases removed in the side stream should be varied depending upon the temperature of the make-up gases which are added and the desired temperature in the succeeding bed. We have found that the degree of cooling of the side stream or the amount of gases removed in the side stream, or both, can be effectively controlled by the temperature in the succeeding bed in the series.

In general, with a reaction initiation temperature of from 430° to about 525° F., a temperature of the gases leaving the bed of 610° to 630° F., the maximum cooling gradient in the side stream will be from 510° to 530° F. Under these conditions with an initial composition of from 2 to 3 per cent carbon monoxide and consuming from 2 to 3 volumes of hydrogen per volume of carbon monoxide, from about 15 to about 35 per cent of the total gas stream may be withdrawn and cooled. In the later beds the partially reacted gases will contain a larger amount of heavier hydrocarbons and oxygenated compounds with a higher heat capacity, and a somewhat lower percentage of the total gas stream may be withdrawn and cooled; for example, from about 12 to about 35 per cent may be withdrawn. The amount of gases which is withdrawn from the side stream may be increased by reducing the amount of cooling which is performed upon the side stream, but it is desirable to cool the gases sufficiently to remove the more volatile hydrocarbons and the oxygenated compounds with low boiling points in order to obtain the previously mentioned advantages of simpler fractionation which result when liquid products are removed from each of the beds.

It is a feature of our invention that a portion of the first reaction products may be removed, as described, from the separator after the first catalyst bed and from the separator after each of the subsequent beds. The reaction products removed from the earlier beds contain a larger percentage of lower boiling materials than those removed from the later beds.

A typical method of carrying out the preferred embodiment will be described in connection with the accompanying drawing in which the single figure is a simplified flow sheet of a reactor system in accordance with the process of our invention. Referring to the drawing, the fresh feed comprising in this case hydrogen and carbon monoxide is fed into the system under pressure at a controlled rate through valved line 5 which leads to line 6 in which are flowing recycle gases, as will later be described. The recycle gases will comprise in addition to butane, propane, ethane, methane and the corresponding unsaturated hydrocarbons; oxygenated organic compounds; carbon monoxide; hydrogen; carbon dioxide; and normally a small amount of nitrogen. These gases will be saturated with water vapor and the proportions in which the several compounds are present in the recycle gases will depend upon the specific conditions employed in separating the gases for recycling from the product gases. Also, because the separation is not clean cut, there will be traces of heavier hydrocarbons.

The mixture of fresh feed and recycle gases is passed through a gas heater 7 wherein the temperature of the gases is preferably raised to the temperature maintained at the top of the first catalyst bed, for example a temperature between about 430° and 500° F. The heated gases are passed from the gas heater through line 8, to a pressure control valve 9 actuated by control means 11, and then to a reaction vessel 12 containing a number of similar solid beds of catalyst 13, 13a, etc. The catalyst bed 13 is supported on a suitable foraminous support 14 and can if desired be confined at its upper surface by a similar foraminous member 16.

The heated gases are introduced at a selected rate such as to obtain a desired initial space velocity; for example, a space velocity (volume of feed gas at standard conditions per volume of catalyst per hour) of 300 or greater. The temperature at the top of catalyst bed 13 is maintained at about the temperature of the entering gases. On passing through the first catalyst bed, the desired synthesis reactions take place resulting in the evolution of considerable heat. Because of the volume of gases in the charge mixture that does not take place in the reaction, running away of the temperature of the catalyst bed is prevented. However, under conditions described, there is an increase of temperature from top to bottom of the first bed of about 125° to 165° F., provided however that the maximum temperature reached does not exceed about 630° F. Thus the temperature at the bottom of the first bed may lie within the range of about 610° to 630° F. At the bottom of the catalyst bed the partially reacted gases are removed and a large portion of the stream is passed through the foraminous plate 17. The foraminous plate 17 is perforated in such a manner that sufficient resistance exists to the passing of gases so that a part of the gases passes down through it and the remainder of the gases is removed through side stream line 18 which is perforated throughout its length within the reaction vessel 12 and extends out of the reaction vessel. The gases in side stream line 18 are passed through heat exchanger 19 which is controlled as described below. The partially cooled gases which are then cooled to a temperature of the order of about 50° to 150° F. are then passed through a separator 21 wherein the first liquid products are removed by line 22.

The remainder of the gases is passed out of the separator 21 by means of return line 23. Make-up gases are added by means of line 24 from the synthesis gas manifold 25 by means of valved line 26. The rate of addition of synthesis gas is controlled by control valve 27 actuated by flow control means 28. This control means may be adjusted to supply a constant amount of make-up gas or it may be made to respond to differences in pressure in the side stream line 23. A controlled amount of hydrogen from valved line 29 connected to hydrogen manifold 30, or a controlled amount of carbon monoxide from valved line 31 connected to carbon monoxide manifold 32, or a controlled amount of each of these gases may be mixed with the synthesis gas from valved line 26 to form make-up gas in line 24. After the make-up gases have been added, the mixture of gas is passed back into the reactor at a point beneath the foraminous plate 17. The gases are then thoroughly mixed and are introduced into the second catalyst bed 13a. Near the bottom of this bed there is positioned a temperature sensitive means 33 connected by appropriate control means 34 to control valve 36 which controls the amount of cooling water passing through the heat exchanger 19 previously mentioned and thus controls the amount of cooling given to the gases introduced immediately above the second catalyst bed 13a.

The gases then pass in like manner through a series of catalyst beds. Each of the beds contains a temperature responsive means which in accordance with variations in temperature in that bed varies the cooling in the side stream from the bed immediately above it. The liquid products condensed in each of the separators are removed and fractionated.

The gases removed from the last catalyst bed in the reactor 12 are passed through line 37 to heat exchanger 38 and through line 39 to cooler 41 where they are further cooled to a temperature of no more than 120° F.; for example, to a temperature between about 60° and about 120° F., the specific temperature being sufficiently low to cause condensation of the desired products. The cooled products are then passed through line 42 to a separator 43 of conventional design. In this separator an aqueous layer and a liquid hydrocarbon layer are formed. The hydrocarbons that are liquid under these conditions are removed from the system through line 46 and the aqueous layer comprising a solution of oxygenated compounds, such as alcohols and ketones, is removed through line 44.

The remaining gaseous products are passed from the separator through line 47 and a portion of them is vented from the system through line 48. The portion vented is regulated to hold system pressure, in this case 150 pounds per square inch, and acts as a bleed to prevent inert gas build-up in the system. When a run is in progress, the amount of vent gas plus total liquid products will be equal in weight to the feed gas. The remaining gases are passed through line 49 and are raised to a pressure somewhat in excess of the desired reaction pressure by means of blower 51 so that the volume of gases recycled to the reactor is about 8 to 15 times the volume of the fresh feed, and then passed by line 52 into line 6 where fresh feed is also introduced as previously described.

In many cases the catalyst is subjected to partial or complete reduction prior to being contacted with the reactor feed. This can be accomplished in the system shown by introducing hydrogen through line 5, raising the temperature of the hydrogen in heater 7 to a temperature, for example, of the order of 600° to 950° F. and then passing the heated gas through the reactor. The gases produced in this reducing procedure may be removed from the system from the bottom of the reaction vessel 12 through by-pass line 54.

The method of the invention may be varied in a number of ways. For example, instead of controlling the amount of cooling water which is introduced to the heat exchanger 19, the amount of gas which is removed in side stream 18 may instead or in addition be regulated by valve 55 in this line which is operated by control means 56. This control means, like control means 34 which controls the cooling water to heat exchanger 19, is actuated by temperature sensitive means 33 in the next bed. The amount of cooling is controlled in the subsequent beds in a similar manner.

When the catalyst used in the various beds is being treated, for example when it is being regenerated, various control instruments can be by-passed. In order to also reduce the resistance which occurs because of the foraminous plates 17, valved by-pass lines 53 can be placed immediately above and below the foraminous plates.

The iron synthesis catalysts employed in the present process can be in the completely oxidized, partially oxidized, or completely reduced state and can, if desired, be employed in conjunction with suitable promoters such as alumina and potassium oxide and can be disposed on suitable supports such as fullers' earth, activated alumina, acid-treated montmorillonite clays and the like. Iron catalysts prepared by precipitation of iron oxide are particularly valuable, especially when employed in the unpromoted state. The extent of reduction of these catalysts has an important effect upon their value in the process. Thus, superior results are obtained when the catalyst has been from 10 to 100 per cent reduced from the oxide and preferably from 50 to 100 per cent reduced from the oxide. The effect of the extent of the reduction of the catalyst is felt most strongly during the period when the unit is being placed on stream although this extent of reduction also has an important effect on the character of the products obtained. In this connection, it will be understood that the catalyst will usually be reduced in the synthesis unit as described above.

As previously indicated, if the maximum temperature is controlled, excellent results are obtained in the present process by maintaining a substantial temperature gradient across the various catalyst beds. The process of our invention has the advantage that as the partially reacted gases are passed through a series of catalyst beds, the amount of diluents formed and the products formed are such that the temperature gradient which occurs in the beds decreases. However, by controlling the amount of cooling which is performed upon the side stream removed before each bed, a substantially constant temperature gradient can be obtained throughout each of the beds used in carrying out the reaction. This has the advantage that the catalyst beds will have practically the same useful life and therefore it will not be necessary to shut down the process because one or more of the catalyst beds require regeneration before the remaining beds require this action.

There will now be described a presently preferred method of carrying out the process of our invention. These runs are carried out in a reactor about 25 feet high with an internal diameter of about 6 feet. In the reactor there are seven catalyst beds which are equally spaced.

The catalyst employed in the preferred method may be a modification of the same base catalyst. The base catalyst is prepared as a precipitated iron oxide which analysis indicates to be $Fe_2O_3$ with only traces of other metals. The catalyst is formed in a compression pelleting machine into cylindrical pellets about one-eighth of an inch in diameter and about one-eighth of an inch in height. Into each catalyst bed comprising a volume of 56.5 cubic feet, about 7,500 pounds of catalyst are charged. The reactor is part of a system such as disclosed in the drawing.

The catalyst is then dried, for example by passing the gas over the catalyst at a temperature of about 250° to 300° F. for about 3 hours. The drying and the subsequent reactions are most conveniently carried out by introducing the gas separately into the bottom of the reactor and removing the reaction or inert gases from the top of the reactor. Hydrogen is a very convenient drying gas because it does not result in the formation of any impurities; however, an inert gas may be used but it must be flushed from the system after the catalyst is dried. At this stage the catalyst in the various beds is in the form of an oxide and may be so used if desired. However, when completely or partially reduced catalysts are to be prepared, heated hydrogen is then flowed over the catalyst at one atmosphere pressure and a space velocity of about 1150. When the catalyst beds have been heated to a temperature of about 510° F., reduction of the catalyst begins to occur. The passage of heated hydrogen in contact with the catalyst is continued until the desired degree of reduction has been attained, the catalyst beds reaching a temperature in the neighborhood of about 650° F. early in the reduction period. The degree of reduction may readily be determined by determining the amount of water which has been formed in the reduction procedure. At times it may be desirable to introduce the hydrogen separately to the various beds or to reverse the direction of flow in order that the first beds contacted with the hydrogen may not be overheated before the last beds are at the desired temperature condition.

The procedures just described are followed not only when preparing a catalyst initially but also when readying a catalyst for use after it has been regenerated.

The reactor is placed on stream by introducing hydrogen and bringing the pressure up to about 150 pounds per square inch. Each of the catalyst beds is brought up to the temperature required for the initiation of the reaction, the specific temperatures being in the range of 425° to 450° F. At this time 600 cubic feet per minute of recycled gas are introduced into the reactor at a temperature of about 450° F. This synthesis gas is prepared by recycling 550 cubic feet per minute of recycle gas and adding 50 cubic feet per minute of synthesis gas containing hydrogen and carbon monoxide in a mol ratio of about 2.5:1. The synthesis gas comprises 3.3 per cent carbon monoxide, 89.9 per cent hydrogen, and the remainder diluents including those hydrocarbons which are being recycled and which are not removed in the final separation step, as will be described below. At the same time, 52 cubic feet per minute of synthesis gas having a hydrogen to carbon monoxide ratio of about 2.5:1, which is the ratio at which the hydrogen and carbon monoxide are being consumed in catalyst beds, are introduced to the second catalyst bed. Synthesis gas is also introduced at rates increasing from 54 to 62 cubic feet per minute to each of the subsequent beds. Initially it is not necessary to remove a large amount of the gases in the side stream, but as the rate of feed introduction is increased the amount of heat which must be removed is gradually increased under full operating conditions. At this time approximately 30 per cent of the gases passing through the reactor are passed through the first separator, cooled, 0.30 pound per minute of liquid products including aqueous phase and hydrocarbon materials is removed from the first separator, and a similar amount of liquids containing hydrocarbons of somewhat heavier molecular weights and higher boiling points is removed from each of the subsequent separators. When the rate of feed introduction has been increased to 500 cubic feet per minute, the gases passing through the first catalyst bed are of the order of 6000 cubic feet per minute and the gases and products from the various stages are increased in like proportions. In the subsequent beds because only a portion of the normally liquid products and the oxygenated products is removed between each bed, the space velocity is increased until in the last catalyst bed the space velocity is of the order of 7,400. The time required to reach full operating conditions depends upon the specific catalyst used and on the composition of the feed and the amount of recycle. At the end of the lining-out period the fresh feeds are being introduced at the reaction initiation temperature into each of the catalyst beds, and the temperature gradient of about 150° F. is being maintained in each of the beds. The inlet temperatures for the various beds are increased slightly as the run progresses in order to counteract the decrease in carbon monoxide conversion caused by the reduction in catalyst activity. The run is continued as long as the conditions of operation described previously are maintained. The most striking indication of unsatisfactory operation is a drop in the mol ratio of hydrogen to carbon monoxide in the reactor feed to the last catalyst bed or even to a bed previous to the last catalyst bed to below 15:1 caused by a reduction in catalyst activity. When the inlet temperatures have been increased to the maximum preferred operating temperature and the hydrogen to carbon monoxide ratio in the reactive feed to the last bed remains below 15:1, it is necessary to close down the unit and reactivate the catalyst.

The catalyst in the reactors which are to be reactivated is then regenerated in the following manner. The reactor is flushed with an inert gas and then a small stream of air (about 65 cubic feet per minute) and a stream of nitrogen (about 180 cubic feet per minute) are introduced. The products of regeneration may be recycled to the catalyst beds at a rate of about 1500 to 1750 cubic feet per minute. The catalyst peak temperature is about 450° F. under these conditions. The air rate is then gradually increased to about 450 cubic feet per minute and the nitrogen feed reduced to zero. The peak temperature of the catalyst is gradually increased to about 950° F. where it is maintained throughout most of the regeneration period, which usually occupies a total time of about 36 hours. The regenerated catalyst after successive on-stream periods is in substantially the same condition as the fresh catalyst introduced into the reactor.

The cycle of operations in the present process comprises the periods described; a period for drying and reducing the catalyst if a completely or partially reduced catalyst is used; a lining-out period; a reaction period; and a regeneration period. The lining-out period and the reaction period, during both of which hydrocarbons are produced, are together referred to as the on-stream period.

When operating in accordance with the invention, conditions that should be observed carefully are the ratio of hydrogen to carbon monoxide and the conversion of carbon monoxide. The ratio of hydrogen to carbon monoxide is indicative of the activity of the catalyst and carbon monoxide conversion and is of course dependent upon the composition of the gases fed to the various catalyst beds. Accordingly, the control of the process can be effected by keeping the amount of hydrogen added between beds constant and varying conditions in accordance with the change in the mol ratio of hydrogen to carbon monoxide in the reactor feed. For example, as pointed out above, if the hydrogen to carbon monoxide ratio in the reactive feed to the last catalyst bed falls below 15:1, the ratio may be increased by increasing the ratio of hydrogen to carbon monoxide in the initial feed to the reactor. The ratio may also be increased by increasing the initial temperature in each of the catalyst beds. However, if the increase in the hydrogen to carbon monoxide ratio of the entering gases or the increase in temperature is not effective to raise the hydrogen to carbon monoxide ratio in the gases fed to the last catalyst bed to above 15:1 either the amount of hydrogen added between beds may be increased or if the carbon monoxide conversion is below 95 per cent, then the on-stream period for the reactor should be discontinued and the catalyst regenerated or replaced.

It will be understood that the conditions disclosed may be varied within the scope of the invention. While it is generally preferred to carry out the process at a pressure of about 150 pounds per square inch, other superatmospheric pressures may be used, such as pressures within the range of about 50 to 650 pounds per square inch. Because pressure does not appear to have a critical effect on the process, higher pressures can be used but are not preferred because their use requires specially designed equipment. Also, provided the other conditions of the process are maintained within the limits described above, the fresh feed space velocity may be varied, the only considerations being the practical ones of overcoming pressure drop through the catalyst beds when high space velocities are employed and of an economical throughput at lower space velocities.

We have stated that the initial reactor feed should be heated prior to being contacted with the catalyst at least to the reaction initiation temperature, which varies depending upon the specific catalyst employed and the activity of the catalyst.

We have also stated that a side stream is removed from the main stream after the reactive gases have passed through the first catalyst bed. The side stream is cooled, liquid products are removed, a make-up gas comprising carbon monoxide is added, the side stream is again mixed with the main stream and the reactive mixture is introduced to the second catalyst bed. A temperature responsive means is placed near the bottom of the second bed and this controls the amount of cooling of the side stream removed from the first bed. In like manner a side stream is removed from the main stream from each catalyst bed and cooled as determined by the temperature of the succeeding bed. The make-up gases added to the side stream may also comprise hydrogen and carbon monoxide. We have also stated that the process can be carried out so as to compensate for a decrease in activity of the catalyst by increasing the temperature during an on-stream period. While hydrocarbons can be produced under other temperature conditions, in general we prefer to maintain this reactor feed or inlet temperature when using a partially or completely reduced iron catalyst within the range of about 430° to about 475° F., the lower temperatures being employed when the catalyst is relatively fresh, either a new catalyst or regenerated catalyst, and the temperature being gradually increased towards the later part of a run. When using an iron oxide catalyst we have found that ordinarily reaction is not initiated unless the reactor feed is heated at least to about 490° F., and better about 500° F. During a run this temperature is preferably increased but the maximum should not ordinarily exceed about 530° F.

From the foregoing description it will be seen that by practicing the present process hydrogen and carbon monoxide can be efficiently converted into desired hydrocarbons and oxygenated compounds in a series of catalyst beds while assuring substantial catalyst life through effective control of the heat created in the exothermic reactions taking place. As previously stated, the control of the temperature of a given catalyst bed is accomplished by varying the amount of the reaction products leaving the preceding bed removed in a side stream and subjected to cooling, or the degree of cooling of the side stream, or both. It will be understood that when reference is made in the claims to controlling the amount of heat removed from a side stream, variation in the quantity of gases removed in such side stream, the degree of cooling of the side stream, or both, is intended. In each case the total quantity of heat required to be removed will be affected by the temperature and quantity of make-up gas added between beds. However, since any variation in the heat content of the make-up gas will affect the temperature of the following bed, the temperature of the reaction mixture contacting that bed will be quickly adjusted to the desired reaction initiation temperature by operation of the control procedure described.

Obviously many modifications and variations of the invention, as hereinbefore set forth, may be made without departing from the spirit and scope thereof, and therefore only such limitations should be imposed as are indicated in the appended claims.

We claim:

1. A process comprising passing into contact with a series of beds of synthesis catalyst maintained at hydrocarbon synthesis temperatures and superatmospheric pressures a reactive mixture comprising hydrogen, carbon monoxide, and recycled gases, removing the partially reacted gases from each of said catalyst beds, withdrawing a side stream of partially reacted gases from between catalyst beds while passing the main stream of partially reacted gases towards the succeeding catalyst bed, cooling said side stream, introducing make-up gas comprising carbon monoxide into said side stream, mixing the resulting cooled side stream with the main stream of partially reacted gases, passing the partially reacted mixture at a hydrocarbon synthesis initiation temperature into contact with the succeeding bed of catalyst, varying the amount of heat removed from said side stream in accordance with variations in temperature of said succeeding catalyst bed, discharging the reacted gases from the last catalyst bed, cooling said reacted gases to condense liquid products formed in the reaction, separating from resulting cooled reaction products the condensed liquid products, and recycling a portion of the remainder of the reaction products into contact with said series of catalyst beds in combination with fresh feed to form said reactive gas mixture.

2. The process of claim 1 in which the make-up gas comprises carbon monoxide and hydrogen.

3. A process comprising passing into contact with a series of beds of iron synthesis catalyst maintained at hydrocarbon synthesis temperatures and superatmospheric pressures a reactive gas mixture comprising hydrogen, carbon monoxide, and recycled gases, removing the partially reacted gases from each of said catalyst beds, withdrawing a side stream of partially reacted gases from between catalyst beds while passing the main stream of partially reacted gases towards the succeeding catalyst bed, cooling said side stream to condense liquid products in said side stream, separating said liquid products from the remainder of said side stream, introducing into said remainder of said side stream make-up gas comprising carbon monoxide, mixing said cooled remainder of said side stream with said main stream, passing the resulting mixture at a hydrocarbon synthesis initiation temperature into contact with the succeeding catalyst bed, varying the amount of heat removed from said remainder of said side stream in accordance with variations in temperature of the succeeding catalyst bed, discharging the reacted gases from the last catalyst bed, cooling said reacted gases to condense liquid products formed in the reaction, separating from resulting cooled reaction products from the last catalyst bed said condensed liquid products, and recycling a portion of the remainder of the reaction products into contact with said series of catalyst beds in combination with fresh feed.

4. The process of claim 3 in which the make-up gas comprises carbon monoxide and hydrogen.

5. A process comprising passing into contact with a series of beds of iron synthesis catalyst maintained initially at a temperature of from 430° to 525° F. and at superatmospheric pressures a reactive gas mixture comprising hydrogen, carbon monoxide, and recycled gases under conditions adapted to produce a temperature gradient within each of said catalyst beds of from 125° to 165° F. and a maximum bed temperature of from 610° to 630° F., removing the partially reacted gases from each of said catalyst beds, removing a side stream of partially reacted gases from between catalyst beds at said maximum temperature of from 610° to 630° F. while passing the main stream of partially reacted gases at a temperature of 610° to 630° F. towards the succeeding catalyst bed, cooling said side stream to a temperature of about 100° F. to condense liquid products in said side stream, separating said liquid products from the remainder of said side stream, introducing into said remainder of said side stream a make-up gas comprising carbon monoxide at a temperature of about 100° F., mixing said cooled remainder of said side stream with said main stream, passing the resulting mixture at a hydrocarbon synthesis initiation temperature into contact with the succeeding catalyst bed, varying the amount of heat removed from said side stream in accordance with variations in the temperature of said succeeding catalyst bed, discharging the reacted gases from the last catalyst bed, separating from resulting reaction products from the last catalyst bed the bulk of the $C_4$ and heavier hydrocarbons and oxygenated compounds not previously removed in said side streams, and recycling a portion of the remainder of the reaction products into contact with said series of catalyst beds in combination with fresh feed.

6. The process of claim 5 in which the make-up gas comprises carbon monoxide and hydrogen.

7. A process comprising passing into contact with a series of beds of iron synthesis catalyst maintained at hydrocarbon synthesis temperatures and superatmospheric pressures a reactive gas mixture comprising hydrogen, carbon monoxide, and recycled gases, removing the partially reacted gases from each of said catalyst beds, removing a side stream of partially reacted gases comprising from 15 to 35 per cent of the total partially reacted gases from between catalyst beds while passing the main stream comprising the remainder of the partially reacted gases towards the succeeding catalyst bed, cooling said side stream to condense liquid products in the side stream, separating said liquid products from the remainder of said side stream, introducing a make-up gas comprising carbon monoxide into contact with said remainder of said side stream, mixing said cooled remainder of said side stream with said main stream to obtain a mixture at a hydrocarbon synthesis initiation temperature, introducing said resulting reaction mixture into the succeeding catalyst bed, varying the amount of heat removed from said remainder of said side stream in accordance with variations in the temperature of said succeeding catalyst bed, discharging the reacted gases from the last catalyst bed, separating from resulting reaction products from the last catalyst bed the bulk of the C4 and heavier hydrocarbons and oxygenated compounds formed in the reaction and not removed in said side streams, and recycling a portion of the remainder of the reaction products into contact with said series of catalyst beds in combination with fresh feed.

8. The process of claim 7 in which the make-up gas comprises carbon monoxide and hydrogen.

9. The process of claim 7 in which the make-up gas comprises hydrogen and carbon monoxide, said mixture comprising hydrogen and carbon monoxide in the ratio at which said gases are consumed in each catalyst bed.

WILLIAM A. HORNE.
VINCENT L. CRAWFORD.

REFERENCES CITED

The following references are of record in the file of this patent:

UNITED STATES PATENTS

| Number | Name | Date |
|---|---|---|
| 2,149,515 | Fischer | Mar. 17, 1939 |
| 2,243,869 | Keith, Jr. et al. | June 3, 1941 |
| 2,256,622 | Murphree et al. | Sept. 23, 1941 |
| 2,276,274 | Keith, Jr. | Mar. 17, 1942 |
| 2,301,687 | Dorschner | Nov. 10, 1942 |
| 2,318,626 | Pier et al. | May 11, 1943 |
| 2,411,255 | Sensel | Nov. 26, 1946 |
| 2,433,255 | Atwell | Dec. 23, 1947 |
| 2,503,356 | Sensel | Apr. 11, 1950 |